United States Patent [19]
Peri

[11] 3,765,357
[45] Oct. 16, 1973

[54] ALL-TERRAIN-VEHICLE

[76] Inventor: Erkki Peri, Hamina, Finland

[22] Filed: Oct. 22, 1971

[21] Appl. No.: 191,721

[30] Foreign Application Priority Data
   Oct. 22, 1970  Finland .............................. 2845/70

[52] U.S. Cl. .............................. 114/67 A, 180/116
[51] Int. Cl. ............................................. B63b 1/34
[58] Field of Search ................. 114/67 R, 67 A, 65, 114/43; 115/1 R; 180/119, 116

[56] References Cited
UNITED STATES PATENTS

| | | | |
|---|---|---|---|
| 3,401,766 | 9/1968 | Laufman et al. ..................... | 180/119 |
| 1,692,354 | 11/1928 | Stone .................................... | 114/43 |
| 3,379,270 | 4/1968 | Hardy et al. ....................... | 114/67 A |

*Primary Examiner*—Milton Buchler
*Assistant Examiner*—Stuart M. Goldstein
*Attorney*—Cushman, Darby & Cushman

[57] ABSTRACT

A vehicle adapted to travel on both water and ice comprises: a vehicle hull; propulsion means carried by said hull; ski-like surfaces carried by said hull and mounted to permit their up-and-down movement relative to said hull; support means acting between said ski-like surfaces and said hull and arranged to provide at all times a substantial degree of support of the hull by the ski-like surfaces; fan means arranged to discharge air continuously into a space below said hull; and enclosure means arranged to restrict leakage of said air from below said hull; the arrangement being such that said air in said space below said hull can provide a considerable degree of support for said hull by an air cushion or ground effect, while permitting said ski-like surfaces to remain in contact with the ground and so provide both support and restraint against lateral movement of the hull relative to the ground.

11 Claims, 17 Drawing Figures

PATENTED OCT 16 1973 3,765,357

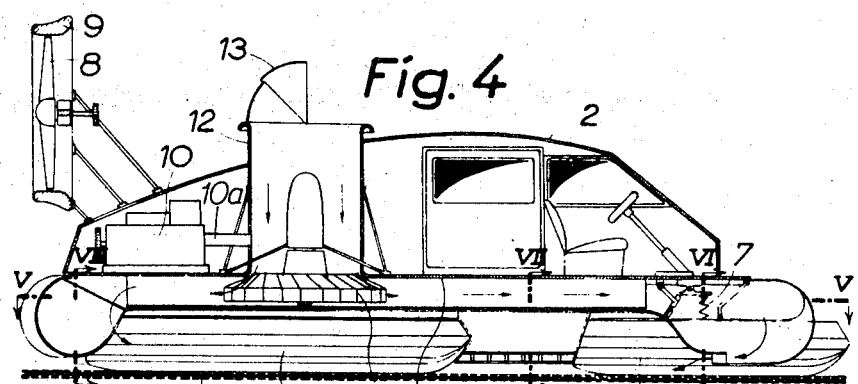
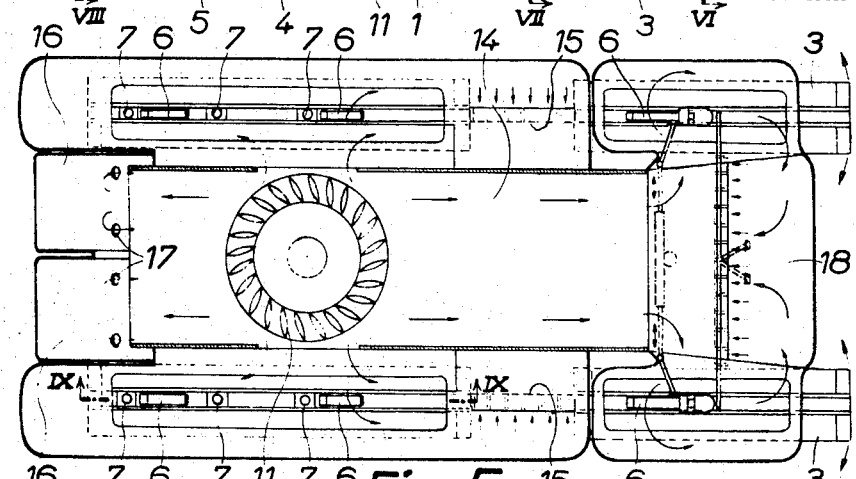
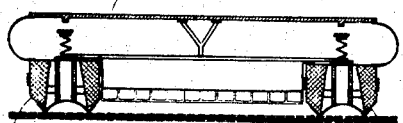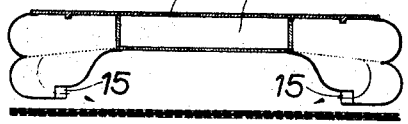
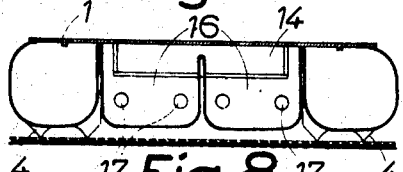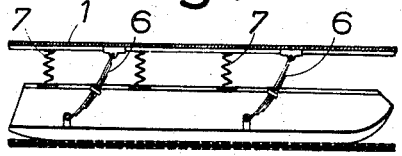

ALL-TERRAIN-VEHICLE

This invention relates to an all-terrain-vehicle (ATV), and although the vehicle described herein is primarily intended for alternative use on water, ice, and winter conditions in Northern latitudes, it obviously can be used over difficult terrain such as swampland.

Many specialised vehicles have been developed to meet difficult terrain, such as the "air boat," consisting of a shallow draught boat driven by an air propeller and used over marshland; the motor sledge, used over ice and snow; and the air cushion or ground effect vehicle in which a cushion of air is established below a hull so that it is completely clear of the ground or water surface, over which the vehicle then travels.

The present invention is directed to the problem of providing a relatively small, light and cheap vehicle which can travel over water, ice and snow. It will be appreciated that although air cushion vehicles have been developed which can meet this requirement, such vehicles necessarily are large and heavy and present serious operational problems such as lateral drift.

According to the present invention, a vehicle adapted to travel on both water and ice comprises: a vehicle hull; propulsion means carried by said hull; ski-like surfaces carried by said hull and mounted to permit their up-and-down movement relative to said hull; support means acting between said ski-like surfaces and said hull and arranged to provide at all times a substantial degree of support of the hull by the ski-like surfaces; fan means arranged to discharge air continuously into a space below said hull; and enclosure means arranged to restrict leakage of said air from below said hull; the arrangement being such that said air in said space below said hull can provide a considerable degree of support for said hull by an air cushion or ground effect, while permitting said ski-like surfaces to remain in contact with the ground and so provide both support and restraint against lateral movement of the hull relative to the ground.

The invention will now be described, by way of example, with reference to the accompanying drawings, in which:

FIG. 4 is a sectional side elevation of the vehicle, taken on the line IV—IV of FIG. 2 and as viewed in the direction indicated by the arrows;

FIG. 5 is a sectional plan view taken on the line V—V of FIG. 4;

FIGS. 6, 7 and 8 are transverse sectional views of a lower part only of the vehicle, and are taken on the lines VI—VI, VII—VII, and VIII—VIII respectively of FIG. 4, and all as viewed in the direction indicated by the arrows;

FIG. 9 is a sectional side elevation taken on the line IX—IX of FIG. 5, and shows in side elevation a rear pontoon of the vehicle;

Figure 1:
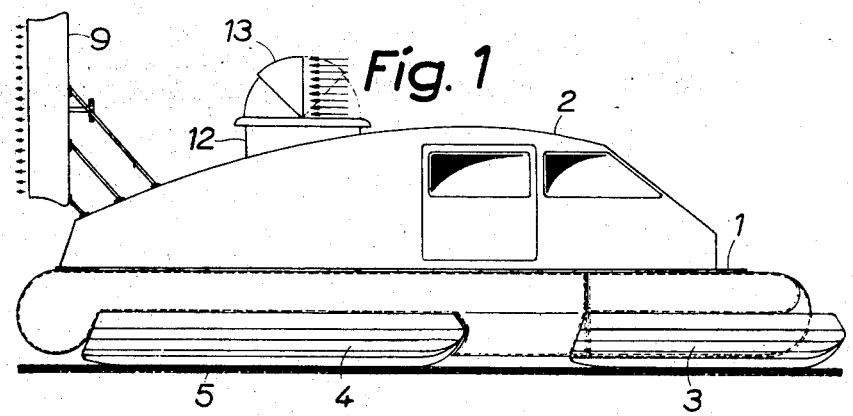
FIG. 1 is a side elevation of an all-terrain vehicle according to the present invention.
Figure 2:
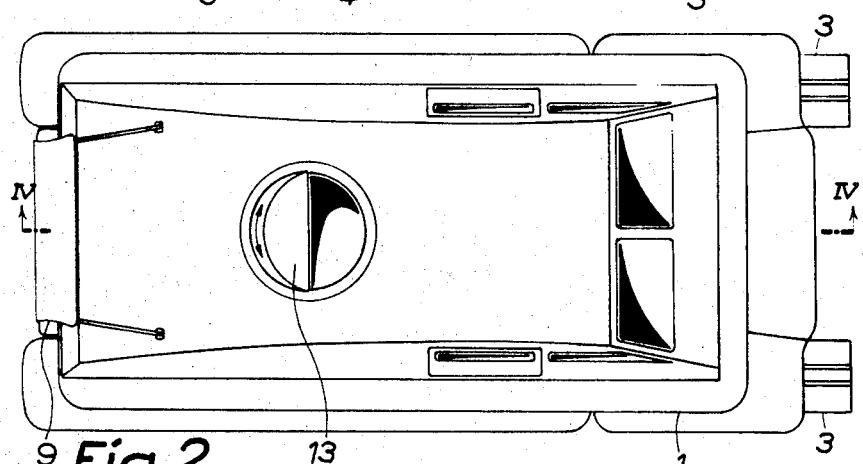
FIG. 2 is a plan view of the vehicle shown in FIG. 1.
Figure 3:
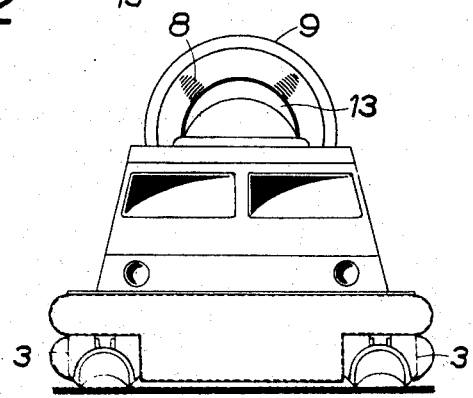
FIG. 3 is a front elevation of the vehicle shown in FIGS. 1 and 2, and is taken from the right-hand side of FIG. 1.

The all-terrain vehicle shown includes a hull 1 on which is mounted a cabin 2. The hull is supported on two front ski-like pontoons 3 and on two rear ski-like pontoons 4. The surface over which the vehicle runs is indicated as surface 5, and it will be appreciated that in practice this surface may be rough or smooth, and it may be in the form of a solid, a liquid, a mud or slush. Each pontoon is connected to the hull on each side by at least one leaf-spring, and helical springs provide further support. Thus, each front pontoon 3 is associated with a helical spring 7 and with leaf springs 6, and each rear pontoon is associated with several helical springs 7 and with two leaf springs 6, as will be seen most clearly in FIGS. 4, 9, 14 and 17.

The vehicle is driven by a propeller 8 surrounded by a rearwardly converging shroud 9 and driven by a motor 10. Motor 10, suitably an internal combustion engine, also drives a compressor 11 to which air flows through vertical duct 12, the upper end of which is provided with a hood or cowl 13 which can be turned into the prevailing wind. A duct 10a supplies waste heat from the motor 10 to the vertical duct 12. A rectangular cross-section air duct 14 is mounted under the hull 1, and air from the compressor 11 flows into this duct, from which it is discharged into a front air space, a rear air space, and two side air spaces.

As will become clearer, later in the description, the vehicle is suspended partly by engagement of the pontoons with the surface 5, whatever its form, and partly by what is known as ground-effect, air being discharged continuously into the space below the hull and providing an upwards lift thereon. It is important to appreciate that, in normal operation, the lift supplied is purposely made insufficient to lift the pontoons off the surface 5.

The construction of the vehicle will now be described in more detail. The cabin 2 can be made of plywood, aluminium or of plastic reinforced by glass fibers. In the example shown, the cabin had a length of 6 metres, a breadth of 3 metres and a height of 1.2 metres. The cabin was designed to provide room for the driver and for technical equipment, and also for sitting passengers as well as for sick pople in resting position on stretchers.

Each front pontoon 3 has a length of 2 metres and a breadth of 0.5 metres, while each rear pontoon has a length of 3.5 metres and a breadth of 0.5 metres. FIG. 6, which relates to the rear pontoons, shows the form of construction used for each pontoon. Each pontoon is in the form of a shell formed of aluminium reinforced with glass fiber, and filled with a light material such as foamed polyurethane (URETAN) or foamed polystyrene (STYROL). It will be seen that a most important feature of each pontoon is the provision of a longitudinal groove or furrow in its undersurface, extending from the front end of the pontoon to its rear end. The vertical depth of this furrow decreases towards the rear end of the pontoon. It has been found useful to use urethane, the density of which is 30 to 60 kilograms per cubic meter. It has been found that the solvents encountered in use do not influence urethane. By using a material with a closed-pore foam, no leakage or absorption of water is caused by eventual damage to the pontoon. FIG. 9 shows how recesses are left in the pontoons for the accommodation of the leaf springs 6, which avoids the presence of supporting springs at the sides of the pontoons, where they could be damaged by rough parts of the surface 5. As a result of the provision of the furrow along the bottom of the pontoon, two sharp ski-like sliding runners are provided respectively on the two sides of the furrow. These runners are particularly useful when the vehicle is passing over ice, while it has been found that such runners also provide good directional stability when the vehicle is operating over snow. In particular, sideways skidding of the pontoon is inhibited. In use, the pontoon sinks into the snow only until the area engaging the snow is sufficient to carry the weight on the pontoon. Air is supplied continuously through the central vertical duct shown in the pontoon to the interior of the longitudinal furrow, and this provides lift on the pontoon so reducing the weight which must be carried by the runners. This air also tends to reduce the friction between the water, sludge or snow and the runners.

As mentioned earlier, the remainder of the vehicle is supported by the leaf springs 6 and the helical springs 7 on the four pontoons, and it will be appreciated that the upper end of each of the leaf springs is fastened to the hull 1, and the lower ends of the springs are fastened to the pontoons. The fastening is such that the pontoon is able to rise and descent in a vertical direction; is able to become inclined in a fore-and-aft direction relative to the horizontal; and in the case of the front pontoons only, is able to turn to some extent in the horizontal plane. All movements of the pontoons, no matter how caused, take place against the biassing effect of the spring forces. The two front pontoons 3 are turnable by a steering wheel shown in FIG. 4, the necessary drive gear and linkage being shown in FIG. 5, together with arrows that indicate the to-and-fro movement of the mechanical linkage. This steering mechanism is such that turning of the front pontoons is combined with an inclination towards the inner curve. It will be appreciated that the hull 1 may change in its elevation relative to the surface 5 by virtue of the ground effect or air cushion. The steering mechanism is therefore designed so that the track of the vehicle remains constant so that the steering is not adversely affected as the height of the hull 1 over the surface 5 changes. If desired, each pontoon can be provided with a readily replaceable bottom or slide, so that when inevitably this bottom becomes damaged, it can be replaced with a new part without replacing the whole pontoon.

The motive power for the vehicle is derived from the motor 10 which drives the propeller 8 through V-belts. Power from the motor 10 also drives the compressor 11, but of course, if desired a second motor can be used to drive the compressor. The flow of air to the compressor is indicated by the arrows, and it will be noted that the cowl 13 can be used not only to increase the final air pressure, by turning it into the direction of the prevailing wind, but also can be used to close the top of the duct 12 leading to the compressor, when the vehicle is not in use.

In order to provide the desired ground-effect or air-cushion lift effect, it is necessary that air discharged into the space below the hull shall be restrained from immediately flowing outwardly. The four pontoons are used to provide enclosure of substantial parts of the two sides of the vehicle, as will be clear from, for example, FIG. 4. Since each pontoon is to be capable of vertical movement relative to the hull 1, it is connected to the hull through a superjacent compartment having flexible walls and communicating with the duct 14. The various springs lie inside this compartment. Some of the air from duct 14 passes down through these compartments and through vertical ducts in the pontoons to the furrows thereunder, to provide further lift. A flexible air bag 18 extends across the front of the vehicle between the two front pontoons 3, and has depending from it a flexible skirt which actually engages the surface 5, but which can be lifted free of that surface 5 by a wire control cable when so desired. This air bag 18 is also provided with an air discharge nozzle directed rearwardly of the skirt, through which air from the compressor is discharged continuously into the general space below the hull. In a similar manner, a second air bag 16 extends between the two rear pontoons 4, and is provided with a second flexible skirt also raisable by a wire control cable when so desired. As shown in FIG. 8, this skirt is split into two parts. The air bag 16 also is arranged to discharge air continuously in a direction inwardly of the associated skirt. The space, at each side of the vehicle, between the front pontoon 3 and the rear pontoon 4, is closed by another air bag shown clearly in FIGS. 4 and 7. As shown in FIG. 7 the two bags are provided with air discharge openings 15 in the form of long horizontal slots provided with rigid partitions, such openings being arranged to discharge air inwardly into the space underneath the hull 1.

It will be noted particularly that all the air discharge openings shown and described are arranged to discharge air near the periphery of the space under the hull, and that further they all discharge air in an inward direction. It has been found that the inflowing air so provided tends to discourage air under the hull from flowing outwardly under the various skirts away from the space under the hull 1.

By the provision of the air bags shown in FIG. 7, between the front pontoons 3 and the rear pontoon 4, free movement of these pontoons relative to one another in the up-and-down sense are permitted, as are limited movements laterally arising from steering of the vehicle. It will be noted that air flows from rear air bag 16 through openings 17 into the space under the hull. Provision is made for raising and lowering this bag, so that it can be prevented from engaging fixed obstacles. For normal obstacles, the provision of the central division in the rear air bag (shown clearly in FIG. 6) permits one part of the bag to lift while the other remains lowered, so reducing loss of air from under the hull. As a result of the shape adopted for the air bag, and the locations of the openings, when the vehicle is making use of the air cushion effect and runs over an uneven surface, the bag does not get caught and damaged. The air bag between the front and rear pontoons (see FIG. 7) is formed with a re-entrant part to increase its flexibility, which part is coupled by a cable, as shown, to an anchor on duct 5 to ensure that the air pressure in the bag shall not merely expand the bag out into part-circular shape.

The air pressure used in the vehicle shown could be, for example, 100 millimetres of water, and the overall arrangement is such that the air cushion provides more lift for the rear end of the vehicle than for the front.

This is done in order that sufficient weight shall remain on the two front pontoons, which are used for steering of the vehicle.

The flexible air bags are made of durable flexible cloth, fastened to the remainder of the vehicle in such a manner that damaged portions of the flexible material may be readily replaced. In order to reduce air leakage between the bags, triangular pieces spreading downward from above are used.

The vehicle is primarily directed to travel on ice and snow, and, in its design, the unevenness to be expected in ice has been a primary consideration. The intention is not to raise the vehicle by means of the air cushion to hover higher than these areas of uneven terrain, largely because the quantity of air required from the compressor would then be very large, and the capacity and the weight of the vehicle would become of such a size that the vehicle could not be constructed at a reasonable cost. On the contrary, the weight to be carried by the pontoons is decreased by the use of the air cushion so that the friction to be overcome in normal travel is reduced, and so that the pusher propeller 8 is able to drive the vehicle also under difficult circumstances.

When the vehicle is water borne and is required to climb onto the ice at the edge of the water, the air cushion effect can be relied upon more heavily to enable the vehicle to climb onto the ice. This operation is facilitated by the manner in which the front pontoons 3 are shaped and mounted. Thus, when the vehicle is running in water and the pontoons meet the edge of the ice, the front ends of the front pontoons first tilt upwardly and then again revert to the horizontal as they ride up onto the ice.

Through the duct 10a, waste engine heat heats the air being supplied to the space under the vehicle hull. It will be appreciated that at very low ambient temperatures, a vehicle left standing for even a short length of time will almost inevitably become frozen to the underlying snow or ice. However, shortly after starting up the driving motor, the air flowing under the hull (which of course being stationary is closely sealed to the underlying ice or ground) raises the temperature of the parts involved so that the ice bond can be broken. This heating of the air also prevents the eventually harmful freezing of the flexible air bags, particularly once the vehicle is in motion. It also reduces the risk of ice formation on walkways of the cabin and hull, and so reduces risk to passengers.

Figure 10:
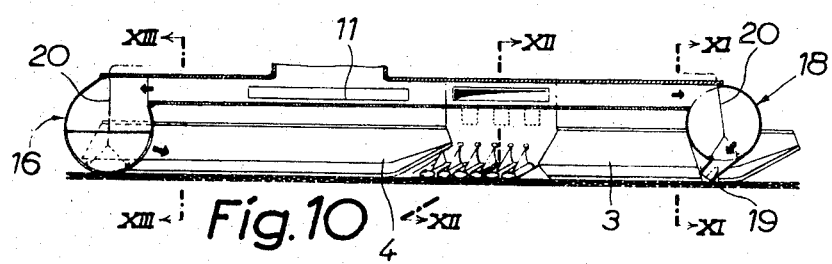
FIG. 10 is a sectional side elevation of a modification of the vehicle in FIG. 1.
Figure 11:
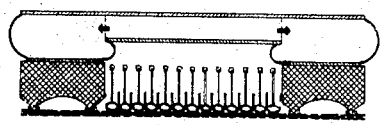
FIGS. 11, 12 and 13 are transverse cross-sections taken respectively on the lines XI—XI, XII—XII and XIII—XIII of FIG. 10.
Figure 12:
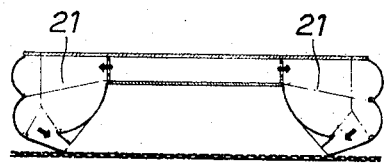

Referring now to the embodiment of the invention shown in FIGS. 10 through 13, it will be seen that either instead of, or in addition to, the four pontoons being connected to the hull by leaf and coil springs, they are mounted on the lower surfaces of flexible air bags which by the upper surfaces support the hull 1. The air bags form air cushions or springs between the moving pontoons and the hull 1. In FIG. 10, the arrows indicate how air from the compressor 11 flows towards the front air bag 18 and flows therefrom through the nozzles 19 (see FIG. 11) which extend right across the space between the two front pontoons 3. The nozzles are directed downwardly and rearwardly, and the bottom of the nozzles serve the function of the skirt of the first embodiment. The lower edges of such a nozzle 19 can be provided with a reinforcing wedge made of TEFLON or other abrasion resistant and low friction material. The flexible part containing the nozzle can be raise by a lifting cable 20 when the vehicle is required to pass over a fixed obstacle. In a similar manner, the rear air bag 16 is provided with a lifting cable 20, and with air discharge nozzles similar to those provided in the front air bag 18, these being directed forwardly into the space under the hull. The construction of the side air bags will be seen from FIGS. 11 to 13. In particular, FIG. 12 shows the construction of the downwardly extending air bag 21 which fills the space between the front and rear pontoons. It will be noted that the air bags 21 have a re-entrant part to facilitate flexing of the air bag as the pontoons rise and fall. The re-entrant part is coupled by a cable 21 to a fixed anchor point, so that the air pressure in air bag 21 will not merely inflate the re-entrant part to lie outwardly of the vehicle, particularly during vertical deflection of the bag. The air bags are provided, as shown in FIG. 12, with air discharge nozzles directed downwardly and inwardly. It will be understood that during operation air is supplied continuously to the rectangular duct 14, and from there passes to the various air bags for discharge either through the nozzle shown or through ports in each pontoon to the furrow below the pontoon.

Figure 13:
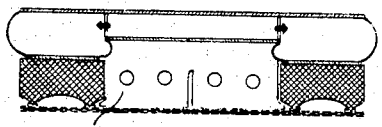

Referring now to FIG. 13, it will be noted that the rear bag 16 is divided into two parts, which can thus move vertically independently of one another, so that when the vehicle runs over a fixed obstacle, the air lost from under the vehicle is reduced.

In arrangements in which air bags or cushions are used either in replacement of or in addition to the various springs shown in FIGS. 1 through 9, if air leaks out of either the rear bag 16 or the front bag 18, the hull of the vessel is still maintained at the proper distance from the ground surface 5, since the air bags or cushions above the pontoons carry the weight of the vehicle. It will be appreciated that the air bags above the pontoons act as air springs for the pontoons, smoothing the movement of the cabin when the pontoons are jolting over an uneven surface. The consequent smooth running of the hull and the cabin is particularly important when the vehicle is used to convey patients.

In normal air cushion or ground effect vehicles, the whole weight of the vehicle is taken by the air cushion established under the vehicle. As a result, if for any reason the air escapes from under the hull, as when crossing a narrow break in the ice or a trench, the vehicle first drops abruptly and then recovers and rises. With the arrangements shown and described above, this does not happen, since at all times an appreciable part of the weight of the vehicle is carried by the pontoons. Further, especially when air bags are used above the pontoons as air springs, the air is retained in the air bags even though the bulk of the air under the hull may escape, and the air bags can therefore accept the full weight of the vehicle and reduce considerably the sudden fall otherwise caused by the sudden loss of air from under the vehicle.

Figure 14:
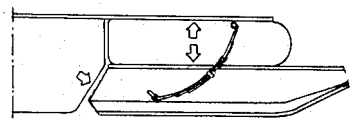
FIGS. 14, 15 and 16 are side elevations illustrating the operation of front pontoons of the vehicle shown in FIG. 1.
Figure 15:
Figure 16:
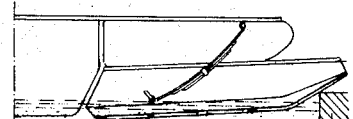
Figure 17:
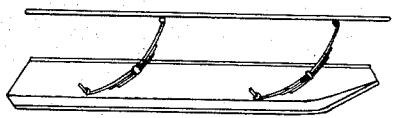
FIG. 17 is a side elevation illustrating a rear pontoon of the vehicle.

FIGS. 14, 15 and 16 illustrate the operation of the front pontoons, which are modified by the method of suspension or attachment used, and also by the existence of the air cushion effect. FIG. 14 shows the manner of operation when the vehicle is moving over a relatively even surface, the air cushion being in operation. The arrows indicate the air pressure in the compartment above the pontoon, which as described in connection with FIGS. 10 through 13, can be a flexible bag to provide a cushioning effect. FIG. 15 illustrates the case where the vehicle is running over a relatively even surface, but without the help of the air cushion. In this case, the side bags are lifted out of contact with the surface 5. FIG. 16 illustrates the operation of driving out of water onto the surface of ice. It will be seen that first the front end of the front pontoon rises, but once it has reached a certain position relative to the ice, it returns to an almost horizontal position, permitting the vehicle to ride onto the ice. FIG. 17 illustrated the suspension or mounting of one of the rearmost pontoons on two springs. The ski pontoons, excluding the cover, are only attached to the hull of the vehicle through the two springs.

It will be seen that by the present invention a novel vehicle is provided which can run and operate under various conditions and on adverse surfaces. The most difficult conditions, as found by experience, are caused to pack ice and deep snow slush, and the present vehicle operates most satisfactorily on such surfaces.

Since the novel vehicle is free from lateral drift, it has a great advantage when operating over the pack ice. An air cushion vehicle, to operate across pack ice, must have a clearance of about 0.5 metre, and such a vehicle is large and expensive. Further, since it is necessary to choose a path round projections in the pack ice, a normal air cushion vehicle is at a bad disadvantage, in that it is not possible to steer such a vehicle precisely because of lateral drift. Should the curtain wall of such a vehicle become damaged, the air cushion is lost, and the vehicle is immobilized until the skirt or curtain wall is repaired.

On the other hand, known forms of air-propeller-driven ice sledges are in considerable difficulty when they encounter cracks in the ice and open water. They also readily freeze to the ice whenever the vehicle stops in really cold weather.

In the vehicle of the present invention, the air cushion principle is applied to lighten the surface-carried load, while still maintaining contact with the surface. The hovering height, as well as the air leakage, are small, so that the power needed to maintain the air cushion is small. It will be noted that the pressure chamber (plenum chamber) principle is used in the preferred embodiments described above.

At times the vehicle will be used merely as a sledge, in which case the unused air bags and skirts can be raised to improve ground clearance and to reduce friction and wear. For water travel, the air cushion normally is not used. However, it is possible to make use of the air cushion to lift the hull so that it is planing on the pontoons, and then to discontinue use of the air cushion, the forward speed being sufficient to maintain the planing action.

It will be noted that by the use of the shroud about the propeller the static thrust is improved, while the steering by means of pontoons is both novel and advantageous.

In lifting the vehicle from water onto ice, the air cushion effect can be cyclically increased and decreased, until the vehicle has reached firm ice, after which the usual degree of air cushion is used.

The vehicle finds considerable use for ambulance service, for the transportation of pilots and coast guard personnel from land bases across shore ice to ships in open water, and for delivery of mail and goods across the ice in a similar manner.

I claim:

1. A vehicle adapted to travel on both water and ice, and comprising:
   a. a vehicle hull;
   b. propulsion means carried by said hull;
   c. ski-like surfaces carried by said hull and mounted to permit their up-and-down movement relative to said hull;
   d. said ski surfaces being provided respectively on a plurality of pontoons each extending fore-and-aft of said hull;
   e. means attaching said pontoons to said hull in a manner permitting said pontoons to move up-and-down independently of one another;
   f. each of said pontoons including a laterally spaced pair of said ski-like surfaces separated by a furrow;
   g. each of said pontoons being provided with means for the continuous supply of air to the furrow between said pair of ski-like surfaces;
   h. support means acting between said pontoons and said hull and arranged to provide a substantial degree of support of the hull by said pontoons;
   i. fan means arranged to discharge air continuously into a space below said hull; and
   j. enclosure means arranged to inhibit leakage of said air from below said hull;
   the arrangement being such that said air in said space below said hull can provide a substantial support for said hull by an air cushion or ground effect, while permitting said ski-like surfaces to remain in contact with the ground and so provide both support and restraint against lateral movement of the hull relative to the ground.

2. A vehicle according to claim 1, in which said enclosure means includes said pontoons and skirt means closing spaces between said pontoons.

3. A vehicle according to claim 2, in which said skirt means include inflatable air bags.

4. A vehicle according to claim 3, in which air ducts are provided between said air bags and said fan means for constantly replenishing said air bags by air from said fan means.

5. A vehicle according to claim 1, and in which said enclosure means includes four of said pontoons disposed parallel to one another in a rectangular formation and provided respectively with said ski-like surfaces, at each side of the vehicle there being a front pontoon and a rear pontoon spaced in a fore-and-aft direction of the hull relative to one another, and inflated air bags arranged to complete said enclosure means and arranged respectively between each front pontoon and the adjacent rear pontoon, between the two front pontoons, and between the two rear pontoons.

6. A vehicle according to claim 5, and in which air ducts are provided between said fan means and said air bags for continuously replenishing said air bags with air from said fan means, and each of said air bags defines air discharge openings for continuously discharging air into the space below the hull to provide said air cushion.

7. A vehicle according to claim 5, in which a part of the enclosure means extending between two said rear pontoons is divided into left-hand and right-hand parts which are capable of upward movement independently of one another, so permitting passage of a fixed obstruction past said part of the enclosure means with only limited escape of air from said space below the hull.

8. A vehicle according to claim 6, and in which said air bag discharge openings are arranged to discharge air in a direction inwardly of the vehicle and in a manner discouraging escape of air under the air bag from said space.

9. A vehicle according to claim 1, in which each of said pontoons contains a closed-pore foamed material which has an overall density considerably less than that of water, whereby said pontoon remains buoyant even when damaged.

10. A vehicle according to claim 1, and in which said propulsion means is a heat engine, the waste heat of which is added to air discharged by said fan means to said space.

11. A vehicle according to claim 1, in which said support means acting between said pontoons and said hull include resilient air-containing bags which serve as a resilient support for the hull on said pontoons.

* * * * *